US008325869B2

(12) United States Patent
Li et al.

(10) Patent No.: US 8,325,869 B2
(45) Date of Patent: Dec. 4, 2012

(54) PHASE CALIBRATION CIRCUIT AND RELATED PHASE CALIBRATION METHOD

(75) Inventors: Yi-Lin Li, Kao-Hsiung (TW); Cheng-Yi Huang, I-Lan Hsien (TW)

(73) Assignee: Realtek Semiconductor Corp., HsinChu (TW)

( * ) Notice: Subject to any disclaimer, the term of this patent is extended or adjusted under 35 U.S.C. 154(b) by 672 days.

(21) Appl. No.: 12/565,761

(22) Filed: Sep. 24, 2009

(65) Prior Publication Data

US 2010/0074374 A1 Mar. 25, 2010

(30) Foreign Application Priority Data

Sep. 24, 2008 (TW) .............................. 97136620 A

(51) Int. Cl.
*H03D 3/24* (2006.01)
(52) U.S. Cl. ...................................... 375/375; 375/376
(58) Field of Classification Search .................. 375/375, 375/130, 326, 257, 354, 376; 455/73, 88, 455/214; 327/141
See application file for complete search history.

(56) References Cited

U.S. PATENT DOCUMENTS

| 5,072,195 | A | 12/1991 | Graham |
| 5,950,115 | A | 9/1999 | Momtaz |
| 7,129,723 | B2 | 10/2006 | Gramegna |
| 2005/0024106 | A1* | 2/2005 | Keaveney et al. ............. 327/157 |
| 2005/0278131 | A1* | 12/2005 | Rifani et al. .................... 702/79 |

FOREIGN PATENT DOCUMENTS

| TW | 200715700 | 4/2007 |
| TW | 200731675 | 8/2007 |

* cited by examiner

*Primary Examiner* — Khai Tran
(74) *Attorney, Agent, or Firm* — Winston Hsu; Scott Margo

(57) ABSTRACT

A phase calibration circuit applied to at least one signal processing module group includes at least two phase calibration modules, a phase detection module and a filter module. An output node of a first phase calibration module is coupled to an input node of a first signal processing module, an input node of a second phase calibration module is coupled to an output node of the first signal processing module, and the first signal processing module receives a calibrated signal outputted from the first phase calibration module and generates a processed signal. The phase detection module is utilized for generating a phase error signal according to a calibrated signal of an $M^{th}$ phase calibration module, where M is an integer equal to or greater than two. The filter module is utilized for generating at least a first and a second phase calibration signal according to the phase error signal.

9 Claims, 4 Drawing Sheets

PHASE CALIBRATION CIRCUIT AND RELATED PHASE CALIBRATION METHOD

BACKGROUND OF THE INVENTION

1. Field of the Invention

The present invention relates to a phase calibration circuit, and more particularly, to a phase calibration circuit and related phase calibration method applied in a receiver of a communication system.

2. Description of the Prior Art

In a pass-band communication system, a baseband signal is modulated onto a carrier and becomes a modulated signal, and a transmitter transmits the modulated signal to a receiver via a channel. Then, for the convenience of the following signal processing, the receiver demodulates the modulated signal to remove the carrier component or decrease a frequency of the carrier. However, generally, the carriers of the transmitter and the receiver are not synchronous, and therefore carrier frequency offset and carrier phase offset issues exist. Therefore, the receiver generally includes a carrier recovery circuit to overcome these issues.

A general carrier recovery circuit includes a signal processing module, a phase calibration module, a phase detector, a filter and a carrier phase accumulator, where a position of the phase calibration module can be determined according to the designer's consideration, that is, the phase calibration module can be positioned before or after the signal processing module. However, if the phase calibration module is positioned before the signal processing module (that is the phase calibration module is used to calibrate an input signal of the signal processing module), the carrier recovery circuit cannot accurately calibrate the carrier phase of the input signal due to a phase difference between a feedback signal and the input signal, and therefore suffers a "tracking" issue. In addition, if the phase calibration module is positioned after the signal processing module, although there is no "tracking" issue, the carrier phase deviation of the signal processed by the signal processing module still exists. Therefore, the designs of the signal processing module are more complex due to the considerations of the carrier phase deviation effect.

SUMMARY OF THE INVENTION

It is therefore an objective of the present invention to provide a phase calibration circuit including a plurality of phase calibration modules and a related phase calibration method, to solve the above-mentioned problems.

According to one embodiment of the present invention, a phase calibration circuit applied to at least one signal processing module group includes at least two phase calibration modules, a phase detection module and a filter module. An output node of a first phase calibration module is coupled to an input node of a first signal processing module, an input node of a second phase calibration module is coupled to an output node of the first signal processing module, and the first signal processing module receives a calibrated signal outputted from the first phase calibration module and generates a processed signal of the first signal processing module. The phase detection module is utilized for generating a phase error signal according to a calibrated signal of an $M^{th}$ phase calibration module, where M is an integer equal to or greater than two. The filter module is utilized for generating at least a first phase calibration signal and a second phase calibration signal according to the phase error signal, where the first phase calibration module generates the calibrated signal of the first phase calibration module according to the first phase calibration signal, and the second phase calibration module generates the calibrated signal of the second phase calibration module according to the second phase calibration signal.

According to another embodiment of the present invention, a phase calibration method applied to at least one signal processing module group includes: providing at least two phase calibration modules, wherein an output node of a first phase calibration module is coupled to an input node of a first signal processing module, an input node of a second phase calibration module is coupled to an output node of the first signal processing module, and the first signal processing module receives a calibrated signal outputted from the first phase calibration module and generates a processed signal of the first signal processing module; generating a phase error signal according to a calibrated signal of an $M^{th}$ phase calibration module, where M is an integer equal to or greater than two; and generating at least a first phase calibration signal and a second phase calibration signal according to the phase error signal, where the first phase calibration module generates the calibrated signal of the first phase calibration module according to the first phase calibration signal, and the second phase calibration module generates the calibrated signal of the second phase calibration module according to the second phase calibration signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
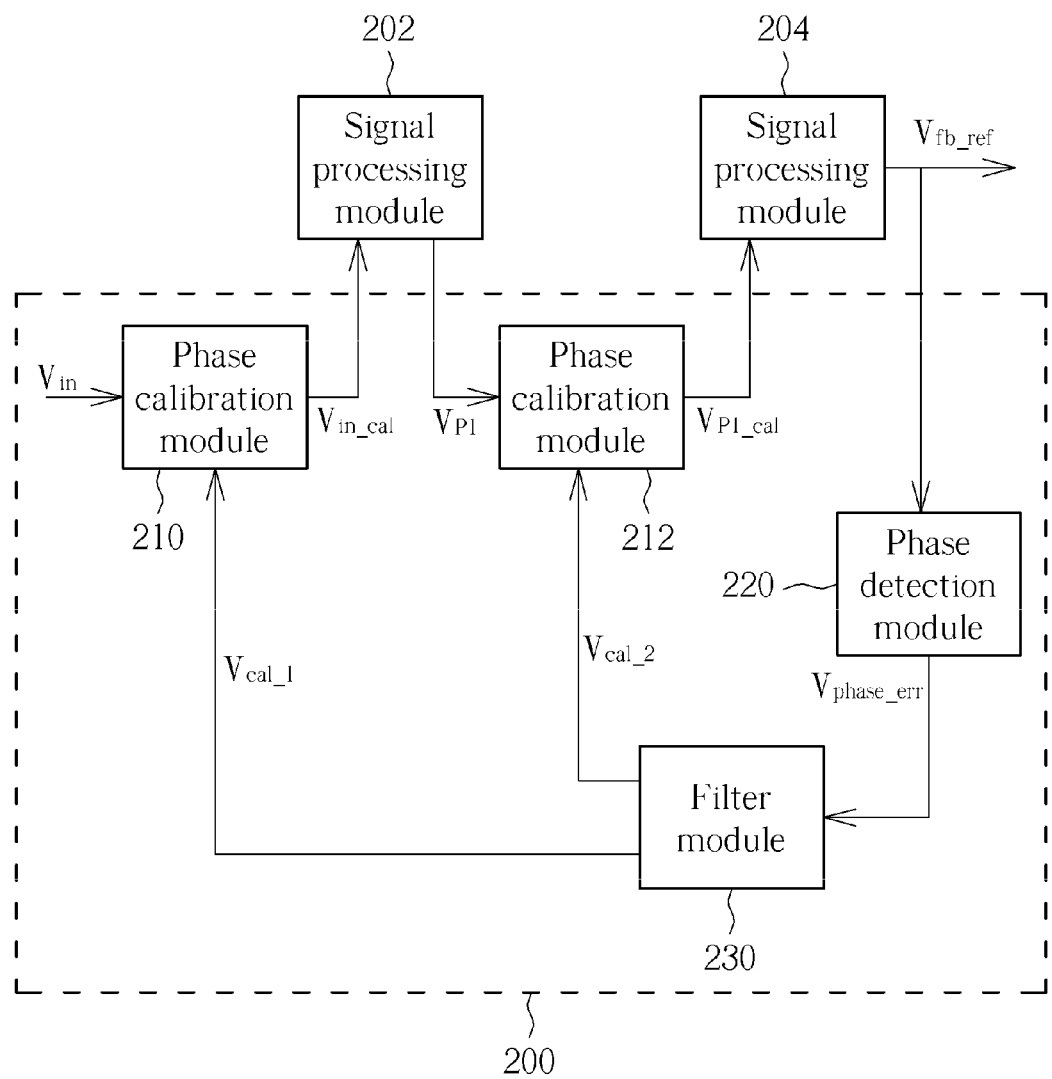
FIG. 1 is a diagram illustrating a phase calibration circuit applied to two signal processing module groups according to one embodiment of the present invention.

FIG. 1 is a diagram illustrating a phase calibration circuit 200 applied to two signal processing module groups 202 and 204 according to one embodiment of the present invention, where each signal processing module group includes at least one signal processing module. As shown in FIG. 1, the phase calibration circuit 200 includes two phase calibration modules 210 and 212, a phase detection module 220 and a filter module 230.

The phase calibration circuit 200 is utilized for separately calibrating carrier phases in different portions of a demodulation circuit of a receiver of a communication system, and to make sure that in each portion of the demodulation circuit, the signal processed by the signal processing module has an accurate carrier phase. The operations of the phase calibration circuit 200 are described as follows.

In the operations of the phase calibration circuit 200, first, the phase calibration module 210 receives an input signal $V_{in}$ and calibrates a phase of the input signal $V_{in}$ according to a phase calibration signal $V_{cal\_1}$ to generate a calibrated signal $V_{in\_cal}$ to the signal processing module 202. Then, the signal processing module group 202 receives the calibrated signal $V_{in\_cal}$ and generates a processed signal $V_{P1}$. Then, the phase calibration module 212 receives the processed signal $V_{P1}$ and calibrates the processed signal $V_{P1}$ according to a phase calibration signal $V_{cal\_2}$ to generate a calibrated signal $V_{P1\_cal}$ to the signal processing module 204. The signal processing module 204 receives the calibrated signal $V_{P1\_cal}$ and generates a feedback reference signal $V_{fb\_ref}$.

After that, the phase detection module 220 generates a phase error signal $V_{phase\_err}$ according to the feedback reference signal $V_{fb\_ref}$, and then, the filter module 230 generates two phase calibration signals $V_{cal\_1}$ and $V_{cal\_2}$ according to the phase error signal $V_{phase\_err}$, and transmits the phase calibration signal $V_{cal\_1}$ and $V_{cal\_2}$ to the phase calibration modules 210 and 212, respectively.

It is noted that the signal processing module 204 is an optional device in the application, in that the phase detection module 220 can obtain the phase error signal $V_{phase\_err}$ directly according to the calibrated signal $V_{pi\_cal}$, and the signal processing module 204 can be removed.

It is noted that in this embodiment, the output of the signal processing module 204 serves as the feedback reference signal $V_{fb\_ref}$, and the phase detection module 220 then generates the phase error signal $V_{phase\_err}$ according to the feedback reference signal $V_{fb\_ref}$. However, in other embodiments of the present invention, the calibrated signal $V_{P1\_cal}$ outputted from the phase calibration module 212 can also serve as the feedback reference signal $V_{fb\_ref}$, that is, the phase detection module 220 can generate the phase error signal $V_{phase\_err}$ according to the calibrated signal $V_{P1\_cal}$.

Figure 2:
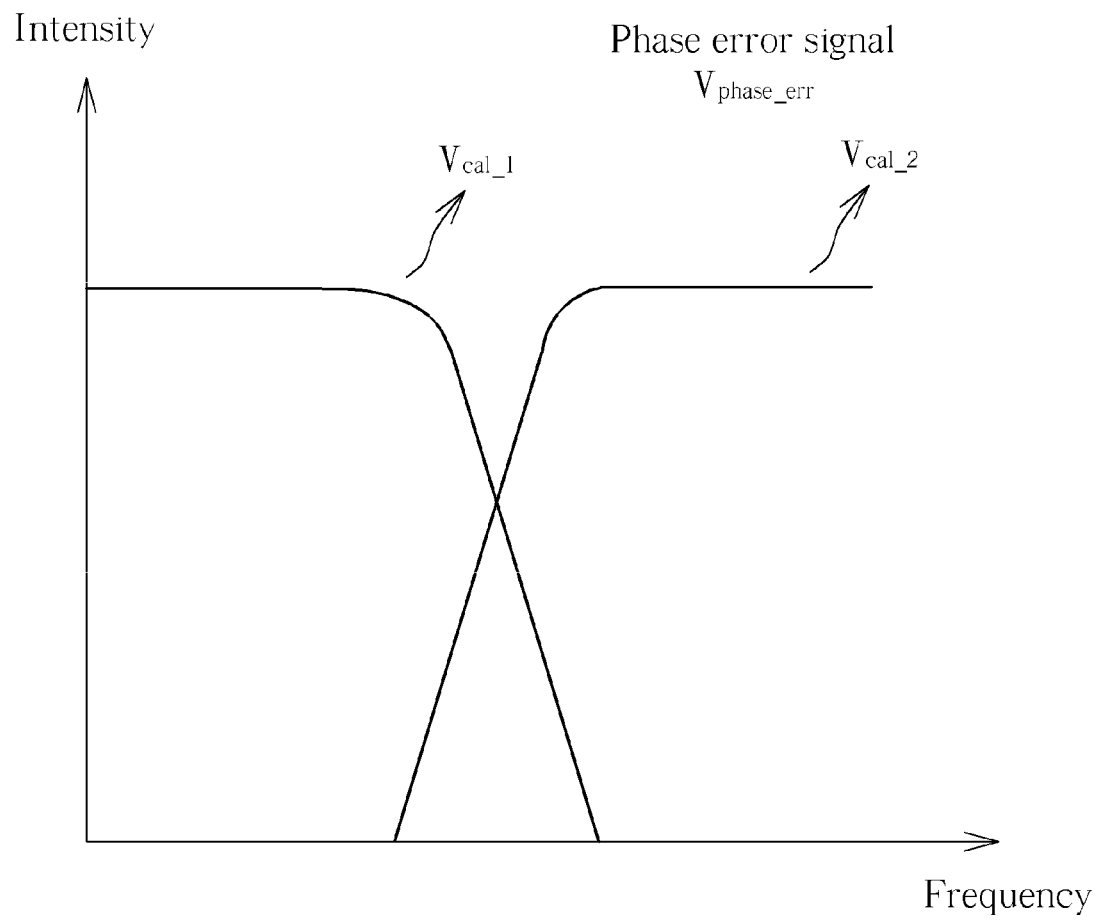
FIG. 2 is a diagram showing the phase calibration signals corresponding to different frequency bands of the phase error signal.

In addition, the phase calibration signals $V_{cal\_1}$ and $V_{cal\_2}$ correspond to different frequency bands of the phase error signal $V_{phase\_err}$, respectively. In this embodiment, the phase calibration signal $V_{cal\_1}$ corresponds to a lower frequency band of the phase error signal $V_{phase\_err}$, and the phase calibration signal $V_{cal\_2}$ corresponds to a higher frequency band of the phase error signal $V_{phase\_err}$. FIG. 2 is a diagram showing the phase calibration signals corresponding to different frequency bands of the phase error signal.

Figure 3:
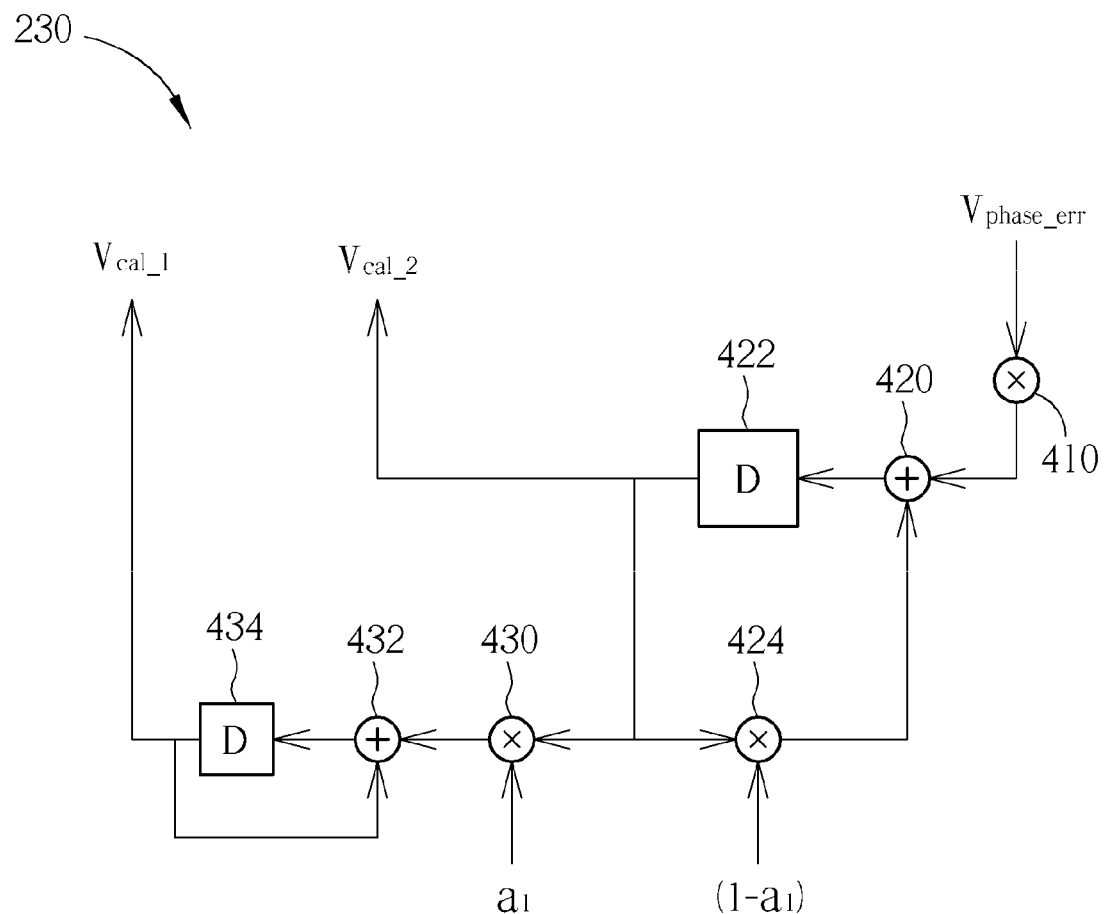
FIG. 3 is a diagram illustrating the filter module according to one embodiment of the filter module shown in FIG. 1.

In practice, the filter module 230 of the phase calibration circuit 200 includes a filter, a phase accumulator and other related circuits. FIG. 3 is a diagram illustrating the filter module according to one embodiment of the filter module 230 shown in FIG. 1. It is noted that, there are many implementations of the filter module 230, and the embodiment shown in FIG. 3 is for exemplary purposes only. As shown in FIG. 3, the filter module 230 includes a filter 410, adder 420 and 432, multipliers 424 and 430, and delay units 422 and 434, where coefficients (multiplier factors) of the multipliers 424 and 430 are $a_1$ and $(1-a_1)$, respectively. In this embodiment, $a_1$ is set as a value far less than one, in the following descriptions, $a_1$ is set as 0.001.

In the operations of the filter module 230, if the phase error signal $V_{phase\_err}$ varies slowly (i.e., a value of the phase error signal $V_{phase\_err}$ is almost constant, and its frequency is much lower), because the coefficient of the multiplier 424 is $(1-0.001)=0.999$, the signal will approach to zero after undergoing the operations of the loop of the multiplier 424, the adder 420 and the delay unit 422 many times. That is, after a period of time, the phase calibration signal $V_{cal\_2}$ will approach to zero. At the same time, the phase calibration signal $V_{cal\_1}$ will gradually increase to a required calibration value by phase accumulation operations of the multiplier 430, the adder 432 and the delay unit 434.

On the contrary, if the phase error signal $V_{phase\_err}$ varies rapidly (i.e., the frequency of the phase error signal $V_{phase\_err}$ is greater), the phase calibration signal $V_{cal\_1}$ will approach to zero, and the phase calibration signal $V_{cal\_2}$ will immediately show a required calibration value.

It is noted that, in the other embodiment of the present invention, the phase calibration circuit 200 can include $M^{th}$ phase calibration modules (M>2), and the filter module can generate $M^{th}$ phase calibration signals according to the phase error signal, and then transmit the $M^{th}$ phase calibration signals to the $M^{th}$ phase calibration modules, respectively.

Figure 4:
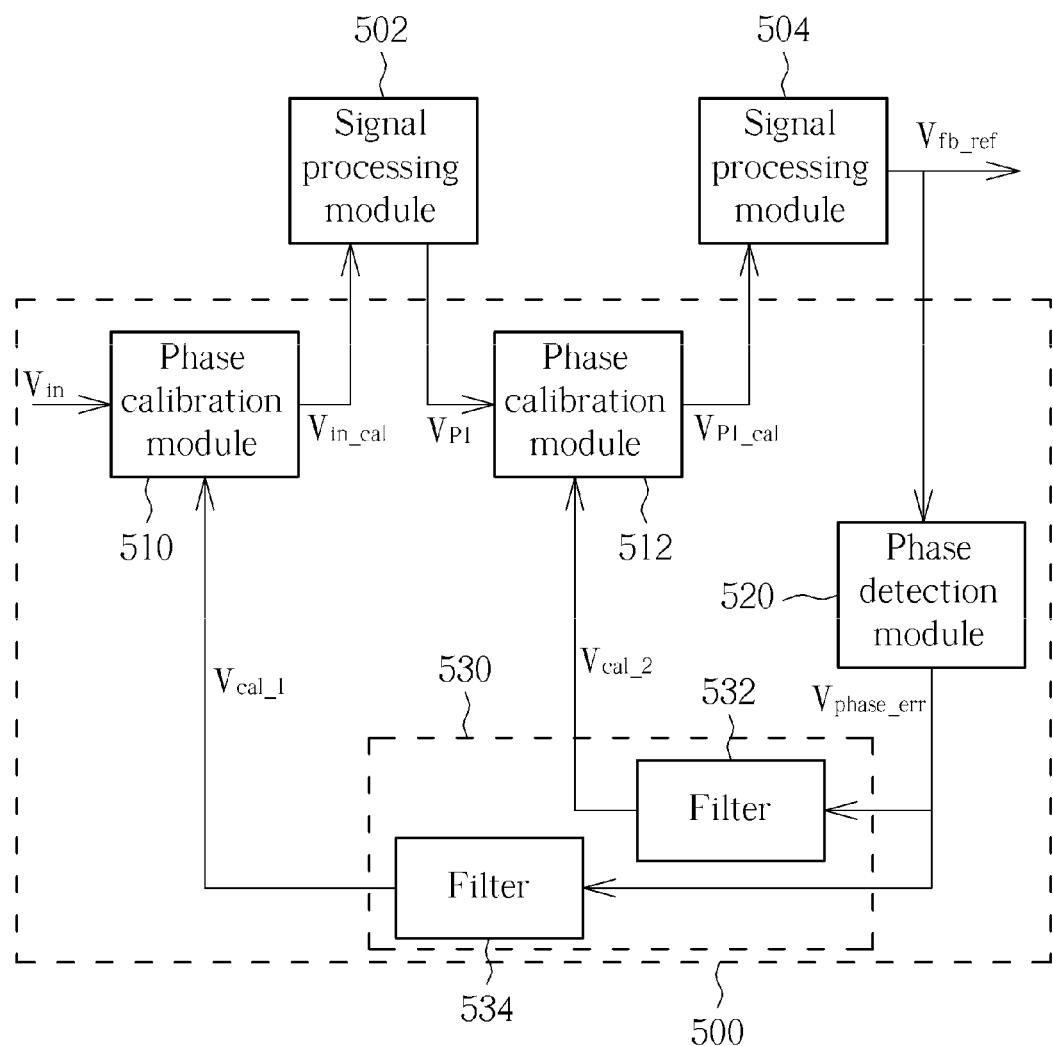
FIG. 4 is a diagram illustrating a phase calibration circuit applied to two signal processing module groups according to another embodiment of the present invention.

Please refer to FIG. 4. FIG. 4 is a diagram illustrating a phase calibration circuit 500 applied to two signal processing module groups 502 and 504 according to another embodiment of the present invention, where each signal processing module group includes at least one signal processing module. The phase calibration circuit 500 includes two phase calibration modules 510 and 512, a phase detection module 520 and a filter module 530, where the filter module 530 includes two filters 532 and 534.

In the phase calibration module 500, the filters 532 and 534 receive the phase error signal $V_{phase\_err}$, and generate the phase calibration signals $V_{cal\_2}$ and $V_{cal\_1}$, respectively, where the parameters of the filters 532 and 534 are designed to make the phase calibration signals $V_{cal\_2}$ and $V_{cal\_1}$ correspond to different frequency bands of the phase error signal $V_{phase\_err}$. The operations of the other components of the phase calibration circuit 500 are similar to that of the phase calibration circuit 200, a person skilled in this art should understand the operations of the phase calibration circuit 500 after reading the above descriptions about the phase calibration circuit 200, the further descriptions are therefore omitted here.

Those skilled in the art will readily observe that numerous modifications and alterations of the device and method may be made while retaining the teachings of the invention.

What is claimed is:

1. A phase calibration circuit applied to at least one signal processing module group, wherein each signal processing module group comprises at least one signal processing module, the phase calibration circuit comprising:
   at least two phase calibration modules, wherein an output node of a first phase calibration module is coupled to an input node of a first signal processing module, an input node of a second phase calibration module is coupled to an output node of the first signal processing module, and the first signal processing module receives a calibrated signal outputted from the first phase calibration module and generates a processed signal of the first signal processing module;
   a phase detection module, for generating a phase error signal according to a calibrated signal of an $M^{th}$ phase calibration module, where M is an integer equal to or greater than two; and
   a filter module, coupled to the phase detection module, for generating at least a first phase calibration signal and a second phase calibration signal according to the phase error signal;
   wherein the first phase calibration module generates the calibrated signal of the first phase calibration module according to the first phase calibration signal, and the second phase calibration module generates the calibrated signal of the second phase calibration module according to the second phase calibration signal.

2. The phase calibration circuit of claim 1, wherein the first phase calibration signal and the second phase calibration signal correspond to different frequency bands of the phase error signal.

3. The phase calibration circuit of claim 2, wherein a frequency band of the phase error signal corresponding to the second phase calibration signal is greater than a frequency band of the phase error signal corresponding to the first phase calibration signal.

4. The phase calibration circuit of claim 1, wherein the filter module comprises a plurality of filters respectively coupled to the phase detection module, and the filters generate at least the first phase calibration signal and the second phase calibration signal according to the phase error signal.

5. The phase calibration circuit of claim 1, being positioned in a demodulation circuit of a receiver of a communication system.

6. A phase calibration method applied to at least one signal processing module group, wherein each signal processing module group comprises at least one signal processing module, the phase calibration method comprising:

providing at least two phase calibration modules, wherein an output node of a first phase calibration module is coupled to an input node of a first signal processing module, an input node of a second phase calibration module is coupled to an output node of the first signal processing module, and the first signal processing module receives a calibrated signal outputted from the first phase calibration module and generates a processed signal of the first signal processing module;

generating a phase error signal according to a calibrated signal of an $M^{th}$ phase calibration module, where M is an integer equal to or greater than two; and generating at least a first phase calibration signal and a second phase calibration signal according to the phase error signal;

wherein the first phase calibration module generates the calibrated signal of the first phase calibration module according to the first phase calibration signal, and the second phase calibration module generates the calibrated signal of the second phase calibration module according to the second phase calibration signal.

7. The phase calibration method of claim 6, wherein the first phase calibration signal and the second phase calibration signal correspond to different frequency bands of the phase error signal.

8. The phase calibration method of claim 7, wherein a frequency band of the phase error signal corresponding to the second phase calibration signal is greater than a frequency band of the phase error signal corresponding to the first phase calibration signal.

9. The phase calibration method of claim 6, being applied in a demodulation circuit of a receiver of a communication system.

* * * * *